A. J. LOEPSINGER.
METHOD FOR PREPARING GLASS BULBS FOR AUTOMATIC SPRINKLERS.
APPLICATION FILED JULY 3, 1912.
1,199,087.  Patented Sept. 26, 1916.
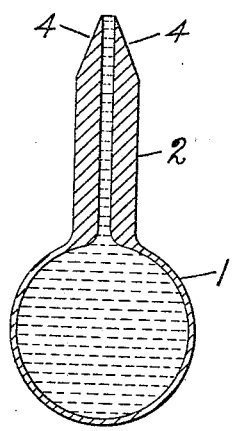
Fig.1.
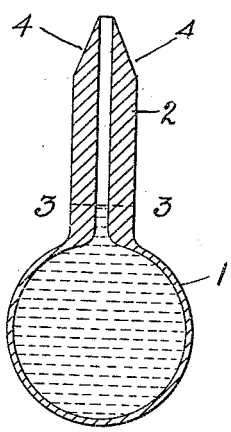
Fig.2.
Fig.3.
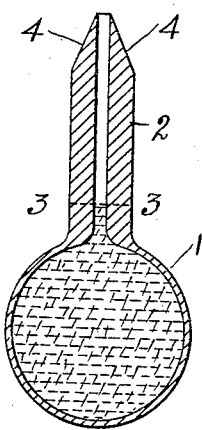
Fig.4.
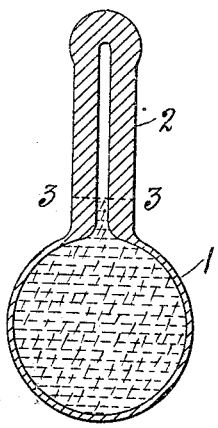
Fig.5.
WITNESSES.
J. L. Thurston
C. G. Bradley
INVENTOR.
Albert J. Loepsinger,
By Wilmarth L. Thurston,
ATTORNEY.

UNITED STATES PATENT OFFICE.

ALBERT J. LOEPSINGER, OF PROVIDENCE, RHODE ISLAND, ASSIGNOR TO GENERAL FIRE EXTINGUISHER COMPANY, OF NEW YORK, N. Y., A CORPORATION OF NEW YORK.

METHOD FOR PREPARING GLASS BULBS FOR AUTOMATIC SPRINKLERS.

1,199,087. Specification of Letters Patent. Patented Sept. 26, 1916.

Application filed July 3, 1912. Serial No. 707,469.

*To all whom it may concern:*

Be it known that I, ALBERT J. LOEPSINGER, of the city and county of Providence and State of Rhode Island, have invented a certain new and useful Method for Preparing Glass Bulbs for Automatic Sprinklers; and I do hereby declare the following specification, taken in connection with the accompanying drawings, forming a part of the same, to be a full, clear, and exact description thereof.

In application of even date, Serial No. 707,467, I have shown and described an automatic sprinkler of that type which embodies in its construction a frangible vessel having expansible contents, and which is caused to be opened by the expansive or explosive force of the contents of such frangible vessel induced by the action of heat. The preferred form of frangible vessel for use in such an automatic sprinkler consists of a glass bulb with an elongated neck.

The present invention relates to the preparation of such glass bulbs for use in automatic sprinklers of the type referred to, and the invention consists in a novel method of preparing such bulbs, which method is illustrated in the accompanying drawings and will be described in connection therewith.

Referring to the drawings Figures 1 to 5 inclusive are sectional views of a bulb illustrating the several steps of the method hereinafter described.

The frangible vessel comprises a glass bulb 1 provided with an elongated hollow neck 2. A sufficient quantity of liquid, preferably water, is placed in the bulb so that when the same is heated up to a desired high temperature, that is, the temperature at which it is desired the sprinkler shall open, as for example 160° Fah., the bulb and its elongated neck will be completely filled with the liquid at such high temperature, as shown in Fig. 1. The bulb and its contents are then cooled to normal temperature, as for example 70° Fah., which will cause a corresponding lowering of the level of the column of liquid in the neck of the bulb, as shown in Fig. 2. A mark, indicated by the dotted line 3—3 in Figs. 2 to 5, inclusive, is then made upon the exterior of the neck at the then level of the column of liquid therein. The water is then entirely removed from the bulb, leaving the bulb empty but with the mark 3—3 on the neck, as shown in Fig. 3. The bulb is then filled with a liquid having a definite prescribed quantity of gas in solution, and preferably with an ammonia gas solution, up to the mark 3—3, which has been made on the neck, the filling of the bulb with the ammonia solution being at normal temperature. As there may be some difference in the coefficient of expansion of the ammonia solution as compared with that of water, it may be desirable to make some allowance for this difference when extreme accuracy is desired, but ordinarily this will not be necessary.

To facilitate the sealing of the bulb the neck is preferably tapered on opposite sides, as shown at 4, 4 in the drawings. Heat is then applied to fuse and close the end of the neck and thus hermetically seal the bulb, as shown in Fig. 5.

If the end of the neck were not tapered as above described, the amount of heat required to heat the quantity of glass at that point might be sufficient to cause an undue amount of the gas to escape from the bulb during the process of sealing. By tapering the end of the neck as above described, the quantity of glass to be fused is materially reduced, thereby correspondingly lessening the amount of heat required to fuse the same, and so as to thereby prevent the escape of any material quantity of the gas from the bulb during the process of sealing.

By the method of preparing the bulb above described the ammonia or other gas solution is prepared outside of the bulb, and may be so prepared with a definite prescribed ratio of the gas to the liquid, and the ammonia or other gas solution so prepared is placed in the bulb at normal temperature.

As above stated, it is preferred to make use of ammonia as the gas to be held in solution by reason of its peculiarly effective explosive properties, but any other suitable gas may be employed, as desired.

What I claim as my invention and desire to secure by Letters Patent is:

1. The method of filling and sealing glass bulbs which consists in first filling the bulb full of a liquid at a desired high temperature, then cooling the bulb and its contents to normal temperature, then emptying the bulb, then filling the bulb with a gas solution at normal temperature up to the level of the liquid when the bulb with the liquid therein was cooled to normal temperature, and then sealing said bulb.

2. The method of filling and sealing glass bulbs which consists in first filling a bulb full of a liquid at a desired high temperature, then cooling the bulb and its contents to normal temperature, then indicating the level of the liquid, then emptying the bulb, then filling the bulb with a gas solution at normal temperature up to such indication, and then sealing said bulb.

3. The method of filling and sealing glass bulbs which consists in first filling a bulb with a neck full of liquid at a desired high temperature, then cooling the bulb and its contents to normal temperature, then making a mark on the neck of the bulb at the level of the liquid, then emptying the bulb, then filling the bulb with a gas solution at normal temperature up to the mark on the neck, and then sealing said neck.

ALBERT J. LOEPSINGER.

Witnesses:
  W. H. THURSTON,
  J. H. THURSTON.